United States Patent [19]

Pimentel et al.

[11] Patent Number: 5,667,146

[45] Date of Patent: Sep. 16, 1997

[54] HIGH-PRESSURE, FLEXIBLE, SELF-SUPPORTIVE, PIPING ASSEMBLY FOR USE WITH A DIFFUSER/NOZZLE

[76] Inventors: Ralph Pimentel, P.O. Box 4172, Topeka, Kans. 66604; Jerry Jones, 5423 SE. 2nd St., Tecumseh, Kans. 66542

[21] Appl. No.: 608,405

[22] Filed: Feb. 28, 1996

[51] Int. Cl.$^6$ .................................................. B05B 15/08
[52] U.S. Cl. ............................ 239/587.1; 239/587.3; 239/587.4; 239/588; 285/146.1; 4/615
[58] Field of Search ..................... 239/587.1, 587.2, 239/587.3, 587.4, 588; 285/166; 4/615

[56] References Cited

U.S. PATENT DOCUMENTS

| | | | |
|---|---|---|---|
| 4,951,329 | 8/1990 | Shaw | 4/568 |
| 4,964,573 | 10/1990 | Lipski | 239/283 |
| 5,022,103 | 6/1991 | Faist | 4/596 |
| 5,046,764 | 9/1991 | Kimura et al. | 285/166 |
| 5,220,697 | 6/1993 | Birchfield | 4/559 |
| 5,265,833 | 11/1993 | Heimann | 248/75 |
| 5,449,206 | 9/1995 | Lockwood | 285/261 |
| 5,481,765 | 1/1996 | Wang | 4/605 |

*Primary Examiner*—Andres Kashnikow
*Assistant Examiner*—Lisa Ann Douglas

[57] ABSTRACT

A high-pressure, flexible, self-supportive, piping assembly for use with a diffuser/nozzle (10), allowing the position of the diffuse/nozzle to be conveniently adjusted in an unlimited number of directions. The invention as defined in its preferred embodiment provides a diffuser/nozzle (10) connected to a first end of the high-pressure, flexible, self-supportive, piping assembly that is made up of a plurality of interconnected ball and socket elements (30) which creates a conduit in which a hose (40) capable of withstanding high-pressure fluids or gases is dispose therein, the said hose is functionlly connected to a fluid supply connector (50) at its second end. The assembly is encased within a plastic shrinkable tubing(60) for additional rigidity and to provide a better gripping surface.

1 Claim, 1 Drawing Sheet

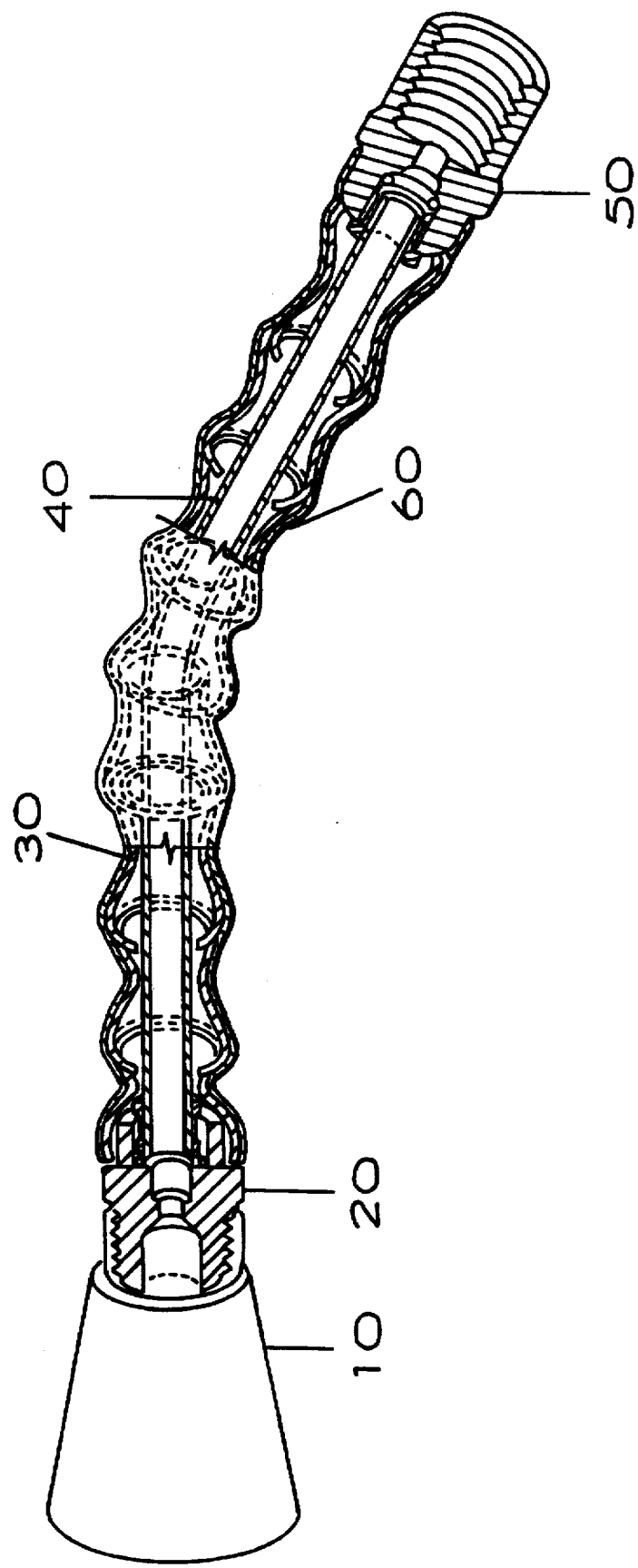

HIGH-PRESSURE, FLEXIBLE, SELF-SUPPORTIVE, PIPING ASSEMBLY FOR USE WITH A DIFFUSER/NOZZLE

FIELD OF INVENTION

The present invention relates to a high pressure, flexible, self-supportive, piping assembly that is integrally connected to the diffuser/nozzle (i.e. showerhead or similar diffuser), allowing the position of the diffuser nozzle to be conveniently adjusted in an unlimited number of heights and directions for an array of applications.

BACKGROUND OF THE INVENTION AND DESCRIPTION OF PRIOR ART

A shower generally has a shower nozzle affixed to the shower stall or to an extension hose which may be flexible but is not self-supportive. Current shower extensions must be hand held (an encumberance for a semi-ambulatory person or a person with only limited use of one or both hands) or must be held in place by a permanently affixed holder. Current shower arms and shower extension holders are limited in the breadth of height adjustments and limited in the scope of directional adjustments, with regards to diffusion. Many shower/bath stalls, particularly those intended for use by handicapped persons, now include methods for adjusting the shower head on a vertical bar or with a configuration of several bars and swivel joints. However, many handicapped persons, once seated in the bath, cannot reach the shower nozzle to adjust it vertically, or once the shower nozzle has been adjusted, readjustment during the shower is difficult or not practical. Those individuals with motor or dexterity hamdicaps must overcome the difficulties to adjust the shower nozzle or seek assistance.

The high-pressure, flexible, self-supportive, piping assembly for use with a diffuser/nozzle can be integrated with a conventional shower nozzles to provide a simple, easily adjustable, third-arm assembly. This third-arm assembly will aid handicapped individuals as well as individuals with other unique showering necessities. Without the use of any mechanical adjusters, the current invention can position the shower nozzle or other similar diffuser to the unique variety of specific heights and angles of direction required by individuals in a wheelchair, using a walk-aide or in a seat. A typical 24" high-pressure, flexible, self-supportive, piping assembly for use with a diffuser/nozzle attached to an existing shower arm in a standard shower stall can place a shower nozzle above the head of a person seven feet tall or directly above the head of a person three feet tall. Additionally, high-pressure, flexible, self-supportive piping assembly for use with a diffuser/nozzle, according to the invention, is designed for either retrofit to an existing shower assembly or for new shower facilities. The high-pressure, flexible, self-supportive, piping assembly can be used in an unlimited number of third-arm scenerios. Lawn & garden use, pet-grooming and in industrial processing applications are but just a few additional uses for the invention.

OBJECT OF INVENTION

It is therefore the object of the present invention to provide an improved piping assembly for use with a diffuser/nozzle.

Another objective of the current invention is to overcome the above-given disadvantages, be simple and inexpensive to build, and allows easy and relatively wear-free angular adjustment of the shower head. The assembly shows no significant stress or reduction in performance after a significant number of adjustments.

SUMMARY OF THE INVENTION

The present invention relates to a high-pressure, flexible, self-supportive piping assembly that is integrally connected to the diffuser/nozzle, allowing the position of the diffuser/nozzle to be conveniently adjusted in an unlimited number of heights and directions. These and other objectives of the present invention are achieved in the preferred embodiment disclosed below by providing a diffuser/nozzle connected to a first end of the high-pressure, flexible, self-supportive, piping assembly. The first end fitting of the assembly is adjoined to a plurality of interconnected ball and socket elements which together creates a flexible and self-supportive conduit for the tubing system installed between the two end fittings of the assembly. Within this assembly the internal piping system allows fluids or gases to be transported at high pressures though said hose from a supply or reservoir attached to the second end of the flexible tube.

According to one preferred embodiment of the invention, the exterior surface of the assembly is wrapped with a heat shrink fitted material (i.e. polyvinylchloride or polyolefin flexible tubing) giving the assemble additional rigidity and allowing it to better support the assembly's weight.

DESCRIPTION OF THE DRAWINGS

The above and other objectives, features, and advantages will become more readily apparent from the following, reference being made to the accompanying drawings in which:

FIG. 1 is perspective view of the high-pressure, flexible, self-supportive, piping assembly for use with a diffuser/nozzle. This includes a detail of the shower head, ball and socket conduit, internal hose, inlet pipe adaptor and the exterior plastic jacket embodying this invention.

REFERENCE NUMBERS IN DRAWING

10 Diffuser/nozzle
20 First end connector
30 Interconnected ball and socket elements
40 Internal Hose
50 Second end connector
60 Plastic shrink wrap covering

DETAILED DISCRIPTION OF THE INVENTION

As seen in FIG. 1 the instant invention basically comprises a diffuser/nozzle, 10, with a first end connector, 20, externally threaded (male iron pipe) adaptor, modified to receive an external socket engaging surface, a plurality of interconnected ball and sockets elements, 30, comprising a conduit or tubing as described in the Lockwood patent, U.S. Pat. No. 5,449,206, a interior hose, 40, a exterior shrink wrap covering, 60, and second end connector, 50, internally threaded (female iron pipe) adaptor. Modified to receive an internal socket engaging surface. The the parts 20, 30, and 50 are normally molded of a durable synthetic resin.

The first end connector, 20, receives the diffuser nozzle, 10, into a annular internally threaded passage. The passage is communicated axially through the connector, 20, to its second end where it receives the hose, 40. The exterior surface of the second end of connector, 20, is adapted to interconnect with the ball and socket elements, 30.

The ball and socket elements, 30, are generally described by the Lockwood patent in the preferred embodiment. A plurality of the ball and socket elements, 30, are interconnected in a manner to form a flexible conduit assembly of a desired length.

The hose, 40, is disposed within the flexible conduit assembly. The hose is made of a material capable of withstanding high temperatures and high pressures (up to 180° F. and 300 psi).

The second end connector, 50, receives the medium to be transported (i.e. water) through an annular internally threaded passage. The passage is communicated axially through the connector 50 to its second end where it receives the hose, 40. The exterior surface of the second end of connector 50 is adapted to interconnect with the ball and socket elements, 30 and is further defined by a cylindrical surface functionally related to the internally threaded passage and a hexagonal surface throughout the body of the second end connector, 50. The first end of the second end connector is an internally threaded (female iron pipe) adaptor.

The ball and socket elements, 30, are wrapped with a heat shrink material, irradiadiated polyvinlychloride flexible tubing, which provides added rigidity and stability to the high-pressure, flexible, self-supportive, piping assembly. Whereby the diffuser head or nozzle will better maintain its position during use.

We claim:

1. A high-pressure, flexible, self-supportive, piping assembly for use with a diffuser/nozzle comprising:

a diffuser/nozzle having a internally threaded end portion communicated to;

a first end connector having an exterior and interior surface and first and second end portions said first end portion having an annular externally threaded passage forming said interior surface, said passage is communicated axially through said first end connector to said second end portion, said exterior surface defining a socket engaging surface at said second end portion; a plurality of ball and socket elements having first and second end portions and a longitudinal axis extending in the direction from the first end to the second end portion, a body defining a passageway therethrough between the first and second end portion of said plurality of ball and socket elements the body including a socket engaging surface at the first end portion thereof, the body also including an internal socket receiving cavity at the second end portion thereof, a second end connector having an exterior and interior surface and first and second end portions, said first end portion of second end connector having a annular internally threaded passage forming said interior surface, said passage is communicated axially through said second end connector to said second end portion thereof, said exterior surface of second end connector is defined by a socket engaging surface at said second end portion thereof, and a hexagonal body adapted for receiving a wrench during installation;

a hose disposed within said passageway and functionally communicated to said first end connector and said second end connector;

a sleeve is disposed around said plurality of ball and socket elements whereby said sleeve provides additional rigidity and support to the high-pressure, flexible, self-supportive, piping assembly.

\* \* \* \* \*

REEXAMINATION CERTIFICATE (3975th)

United States Patent
Pimentel et al.

[11] B1 5,667,146
[45] Certificate Issued Jan. 11, 2000

[54] HIGH-PRESSURE, FLEXIBLE, SELF-SUPPORTIVE, PIPING ASSEMBLY FOR USE WITH A DIFFUSER/NOZZLE

[76] Inventors: Ralph Pimentel, P.O. Box 4172, Topeka, Kans. 66604; Jerry Jones, 5423 SE. 2nd St., Tecumseh, Kans. 66542

Reexamination Request:
No. 90/005,107, Sep. 14, 1998

Reexamination Certificate for:
Patent No.: 5,667,146
Issued: Sep. 16, 1997
Appl. No.: 08/608,405
Filed: Feb. 28, 1996

[51] Int. Cl.$^7$ .................................................. B05B 15/08
[52] U.S. Cl. .................................. 239/587.1; 239/578.4; 239/588; 285/146.1; 4/615
[58] Field of Search .................... 239/587.1, 587.2, 239/587.3, 587.4, 588; 285/166; 4/615

[56] References Cited

U.S. PATENT DOCUMENTS

| | | |
|---|---|---|
| 1,451,800 | 4/1923 | Agner . |
| 1,500,921 | 7/1924 | Bramson et al. . |
| 2,759,765 | 8/1956 | Pawley . |
| 2,873,999 | 2/1959 | Webb . |
| 3,910,277 | 10/1975 | Zimmer . |
| 3,929,164 | 12/1975 | Richter . |
| 4,243,253 | 1/1981 | Rogers, Jr. . |
| 4,383,554 | 5/1983 | Merriman . |
| 4,972,048 | 11/1990 | Martin . |
| 5,032,015 | 7/1991 | Christianson . |
| 5,449,206 | 9/1995 | Lockwood . |

FOREIGN PATENT DOCUMENTS 8902-957  6/1991  Netherlands .

OTHER PUBLICATIONS

Definition of "nut" from McGraw–Hill Concise Encyclopedia of Science & Technology, p. 1183, Sybil P. Parker, (Editor–in–Chief) (1984).

*Primary Examiner*—Andres Kashnikow

[57] ABSTRACT

A high-pressure, flexible, self-supportive, piping assembly for use with a diffuser/nozzle (10), allowing the position of the diffuse/nozzle to be conveniently adjusted in an unlimited number of directions. The invention as defined in its preferred embodiment provides a diffuser/nozzle (10) connected to a first end of the high-pressure, flexible, self-supportive, piping assembly that is made up of a plurality of interconnected ball and socket elements (30) which creates a conduit in which a hose (40) capable of withstanding high-pressure fluids or gases is dispose therein, the said hose is functionally connected to a fluid supply connector (50) at its second end. The assembly is encased within a plastic shrinkable tubing(60) for additional rigidity and to provide a better gripping surface.

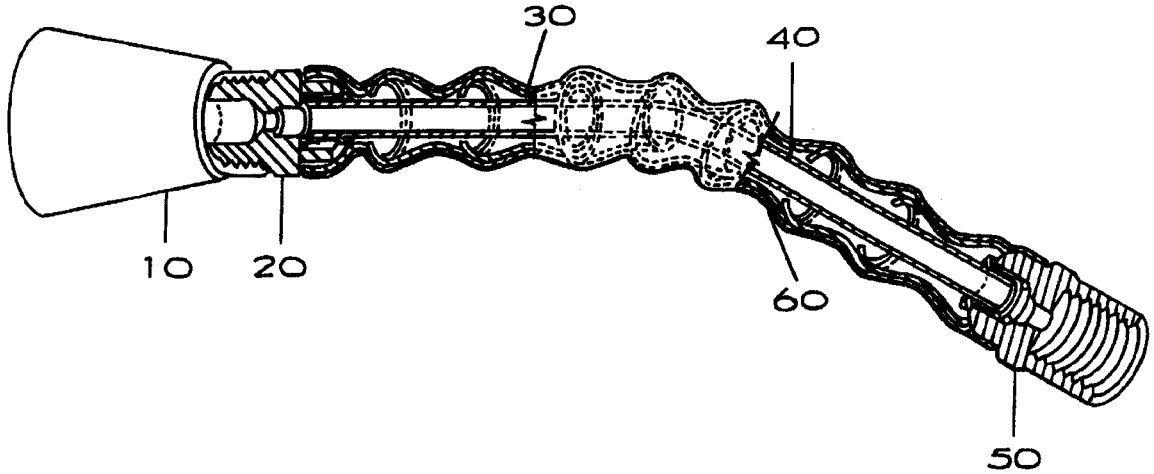

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claim 1 is confirmed.

* * * * *